United States Patent
Takada et al.

(10) Patent No.: US 11,446,611 B2
(45) Date of Patent: Sep. 20, 2022

(54) SEPARATING MEMBRANE AND METHOD FOR MANUFACTURING SEPARATING MEMBRANE

(71) Applicant: TORAY INDUSTRIES, INC., Tokyo (JP)

(72) Inventors: Koichi Takada, Shiga (JP); Gohei Yamamura, Shiga (JP); Hiroki Eimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 68 days.

(21) Appl. No.: 16/499,079

(22) PCT Filed: Mar. 30, 2018

(86) PCT No.: PCT/JP2018/014001
§ 371 (c)(1),
(2) Date: Sep. 27, 2019

(87) PCT Pub. No.: WO2018/182027
PCT Pub. Date: Oct. 4, 2018

(65) Prior Publication Data
US 2020/0038814 A1    Feb. 6, 2020

(30) Foreign Application Priority Data
Mar. 30, 2017   (JP) .............................. JP2017-067096

(51) Int. Cl.
*B01D 69/02*    (2006.01)
*B01D 69/08*    (2006.01)
(Continued)

(52) U.S. Cl.
CPC ............. *B01D 69/02* (2013.01); *B01D 69/08* (2013.01); *B01D 69/087* (2013.01); *B01D 71/18* (2013.01);
(Continued)

(58) Field of Classification Search
CPC ...... B01D 69/02; B01D 69/08; B01D 69/087; B01D 71/18; B01D 71/48; B01D 71/56;
(Continued)

(56) References Cited

U.S. PATENT DOCUMENTS

| | | | |
|---|---|---|---|
| 3,883,626 A | 5/1975 | Kamide et al. | |
| 4,613,441 A * | 9/1986 | Kohno | H01M 50/40 210/500.36 |

(Continued)

FOREIGN PATENT DOCUMENTS

| | | |
|---|---|---|
| CN | 101781466 A | 7/2010 |
| CN | 102099099 A | 6/2011 |

(Continued)

OTHER PUBLICATIONS

Tjaden, Bernhard et. al., The application of 3D imaging techniques, simulation and diffusion experiments to explore transport properties in porous oxygen transport membrane support materials, Feb. 2016, Solid State Ionics, 288 (2016) 315-321. (Year: 2016).*

(Continued)

*Primary Examiner* — Bradley R Spies
*Assistant Examiner* — Jeannie McDermott
(74) *Attorney, Agent, or Firm* — Birch, Stewart, Kolasch & Birch, LLP (57) ABSTRACT

The present invention addresses the problem of providing a separating membrane mainly comprising a thermoplastic resin having high permeability. The present invention relates to a separating membrane including a thermoplastic resin, wherein the width of voids in the separating membrane is at least equal to 1 nm and at most equal to 1000 nm, and the curvature rate of the voids is at least equal to 1.0 and at most equal to 6.0.

2 Claims, 1 Drawing Sheet

(51) Int. Cl.
    *B01D 71/56* (2006.01)
    *B01D 71/18* (2006.01)
    *B01D 71/48* (2006.01)
    *D01D 5/08* (2006.01)
    *D01D 5/24* (2006.01)
    *D01F 2/28* (2006.01)

(52) U.S. Cl.
    CPC ............ *B01D 71/48* (2013.01); *B01D 71/56* (2013.01); *D01D 5/08* (2013.01); *D01D 5/24* (2013.01); *D01F 2/28* (2013.01); *B01D 2325/06* (2013.01)

(58) Field of Classification Search
    CPC .... B01D 2325/06; B01D 69/00; B01D 71/14; B01D 2325/02; D01D 5/08; D01D 5/24; D01F 2/28
    See application file for complete search history.

(56) References Cited

U.S. PATENT DOCUMENTS

| | | | |
|---|---|---|---|
| 5,277,820 A | 1/1994 | Ash | |
| 5,290,414 A | 3/1994 | Marple | |
| 5,536,412 A | 7/1996 | Ash | |
| 5,919,369 A | 7/1999 | Ash | |
| 2011/0174723 A1 | 7/2011 | Kawaguchi et al. | |
| 2013/0020243 A1 | 1/2013 | Han et al. | |
| 2014/0021416 A1 | 1/2014 | Oguni et al. | |
| 2015/0209735 A1* | 7/2015 | Hara | B01D 67/0016 210/321.87 |
| 2016/0089638 A1 | 3/2016 | Schuster et al. | |
| 2017/0296984 A1 | 10/2017 | Yamamura et al. | |
| 2017/0358817 A1 | 12/2017 | Sawamoto et al. | |
| 2018/0021755 A1* | 1/2018 | Suchanek | B01J 23/36 502/348 |
| 2018/0065093 A1 | 3/2018 | Takada et al. | |
| 2018/0117537 A1 | 5/2018 | Yamamura et al. | |
| 2018/0280893 A1 | 10/2018 | Takada et al. | |

FOREIGN PATENT DOCUMENTS

| | | |
|---|---|---|
| CN | 103415571 A | 11/2013 |
| EP | 1 127 608 A1 | 8/2001 |
| EP | 1 849 821 A1 | 10/2007 |
| EP | 2 530 114 A1 | 12/2012 |
| JP | 9-507414 A | 7/1997 |
| JP | 2002-265658 A | 9/2002 |
| JP | 2007-254509 A | 10/2007 |
| JP | 2008-93503 A | 4/2008 |
| JP | 2011-68883 A | 4/2011 |
| JP | 2011-212638 A | 10/2011 |
| JP | 2011-235204 A | 11/2011 |
| JP | 2012-233018 A | 11/2012 |
| JP | 2013-22588 A | 2/2013 |
| JP | 2015-157278 A | 9/2015 |
| JP | 2016-523698 A | 8/2016 |
| TW | 200932813 A | 8/2009 |
| WO | WO 2009/060836 A1 | 5/2009 |
| WO | WO 2014/191296 A1 | 12/2014 |
| WO | WO 2016/052675 A | 4/2016 |
| WO | WO 2016/098660 A1 | 6/2016 |
| WO | WO 2016/159333 A | 10/2016 |
| WO | WO 2016/175308 A1 | 11/2016 |
| WO | WO 2017/057766 A1 | 4/2017 |

OTHER PUBLICATIONS

Chinese Office Action for Chinese Application No. 201880022682. 2, dated Apr. 27, 2021, with an English translation.
Office Action dated May 7, 2021, in Republic of Korean Patent Application No. 10-2019-7028097.
International Search Report, issued in PCT/JP2018/014001, PCT/ISA/210, dated Jun. 19, 2018.
Written Opinion of the International Searching Authority, issued in PCT/JP2018/014001, PCT/ISA/237, dated Jun. 19, 2018.
Office Action dated Aug. 13, 2020, in Indian Application No. 201947039098.
Extended European Search Report dated May 18, 2020, in European Patent Application No. 18774744.9.
Partial Supplementary European Search Report dated Apr. 6, 2020, in European Patent Application No. 18774744.9.
Information Offer issued Feb. 1, 2022, in Japanese Patent Application No. 2018-519974.
Sakai et al., "Structural analysis using RI of the hollow blood purification membrane," Jpn. J. Artif. Organs (1986), vol. 15, No. 3, pp. 1541-1544.
Office Action dated Nov. 24, 2021, in Chinese Patent Application No. 201880022682.2.
Wu et al., "Study on the relationship between tortuosity and permeability in porous media," Journal of North China Institute of Science and Technology (Aug. 2016), vol. 13, No. 4, pp. 56-59.
Office Action dated Feb. 8, 2022, in Japanese Patent Application No. 2018-519974.

* cited by examiner

SEPARATING MEMBRANE AND METHOD FOR MANUFACTURING SEPARATING MEMBRANE

TECHNICAL FIELD

The present invention relates to a separation membrane and a method for producing the separation membrane.

BACKGROUND ART

In recent years, porous separation membranes have been used in various fields, for example, water treatment fields such as water purification treatment and wastewater treatment, medical applications such as blood purification, food industry fields, separators for batteries, charged membranes, electrolyte membranes for fuel cells, and the like.

Cellulose-based resins have been widely used as porous separation membranes including water treatment membranes, because they have permeation performance due to their hydrophilicity and have chlorine resistance performance of being resistant to chlorine-based bactericides.

For example, Patent Document 1 discloses a technique for obtaining a hollow fiber membrane by discharging a membrane forming solution including cellulose triacetate, a solvent, and a non-solvent into a coagulation liquid including a solvent, a non-solvent, and water to cause phase separation.

In addition, Patent Document 2 discloses a hollow fiber membrane for ultrafiltration, characterized in that hydroxyalkyl cellulose is fixed to the hollow fiber membrane in a form of fine particles, and a size of the hydroxyalkyl cellulose fine particles present in up to 1 μm depth from an outermost surface of the hollow fiber membrane is 5 nm to 100 nm.

BACKGROUND ART DOCUMENTS

Patent Documents

Patent Document 1: JP-A-2011-235204
Patent Document 2: JP-A-2015-157278

SUMMARY OF THE INVENTION

Problems that the Invention is to Solve

The hollow fiber membranes obtained by the techniques described in Patent Documents 1 and 2 are asymmetric membranes and have separating layers with a small pore diameter which is responsible for a separation function, but the layers are made thin in order to obtain high water permeation performance, and there were problems that defects tend to occur easily. On the contrary, when the separating layers are made thick in order to reduce the occurrence of defects, there were problems that the water permeation performance is lowered.

In view of such a background of the conventional techniques, an object of the present invention is to provide a separation membrane or the like having high water permeability.

Solution for Problems

In order to solve the above-described problems, the present inventors made extensive and intensive investigations. As a result, it has been found that a separation membrane including a thermoplastic resin and voids with a tortuosity of 1.0-6.0 can be provided, in which a minute pore diameter region where the voids have a width of 1 nm-1,000 nm has high water permeability. The present invention has been thus accomplished.

Namely, the present invention includes the following configurations.

[1] A separation membrane including a thermoplastic resin, in which the separation membrane has voids therein which have a width of 1 nm-1,000 nm, and the voids have a tortuosity of 1.0-6.0.

[2] The separation membrane according to [1] including a co-continuous structure that comprises a phase comprising the thermoplastic resin, and the voids.

[3] The separation membrane according to [1] or [2], in which, in a graph with horizontal axis for wavenumber and vertical axis for intensity, which is obtained by Fourier transformation of a microscopic image photographed in a square visual field with each side having a length 10 times to 100 times the width of the voids of the separation membrane, when a peak half width is set as (a) and a peak maximum wavenumber is set as (b) in the graph, a region of 0<(a)/(b)<5 is included therein.

[4] The separation membrane according to any one of [1] to [3], which has a membrane permeation flux at 50 kPa and 25° C. of 0.05 $m^3/m^2/h$–20 $m^3/m^2/h$.

[5] The separation membrane according to any one of [1] to [4], which has a thickness of 1 μm-1,000 μm.

[6] The separation membrane according to any one of [1] to [5], which has a shape of a hollow fiber.

[7] The separation membrane according to [6], in which the shape of a hollow fiber has an outer diameter of 100 μm-5,000 μm.

[8] The separation membrane according to any one of [1] to [7], in which the thermoplastic resin includes at least one compound selected from the group consisting of cellulose esters, polyamides, and polyesters.

[9] The separation membrane according to [8], in which the cellulose esters are cellulose acetate propionate and/or cellulose acetate butyrate.

[10] The separation membrane according to [8], in which the polyamides are nylon-6 and/or nylon-66.

[11] The separation membrane according to [8], in which the polyesters are poly(lactic acid)-based polymers and/or polyethylene terephthalate.

[12] A method for producing a separation membrane, including:

a resin melting step of melting and kneading 20 wt % to 90 wt % of a thermoplastic resin and 10 wt % to 60 wt % of a structure-forming agent to prepare a molten resin;

a molding step of discharging the molten resin from a discharge spinneret to obtain a membrane-shaped molded product;

a co-continuous structure forming step of subjecting the molten resin or molded product to heat-induced phase separation in a liquid having a temperature of 40-220° C. to form a co-continuous structure, which includes a first phase comprising the thermoplastic resin and a second phase partially compatible with the first phase; and an eluting step of eluting the second phase from the molded product to form voids, after the co-continuous structure forming step and the molding step.

[13] The method for producing a separation membrane according to [12], in which the thermoplastic resin is a cellulose ester.

[14] The method for producing a separation membrane according to [12] or [13], in which a spinning spinneret is used as the discharge spinneret in the molding step to form a hollow fiber.

Advantages of the Invention

The separation membrane of the present invention includes a phase including a thermoplastic resin and has voids therein, the voids having a tortuosity of 1.0-6.0. The closer the tortuosity to 1, the higher the linearity and the smaller the channel length. Thus, a low tortuosity causes a shorter channel length and easy water flow, resulting in high water permeability.

MODE FOR CARRYING OUT THE INVENTION

The present inventors made extensive and intensive investigations regarding the above-described problems, namely, a separation membrane having high water permeability and including a thermoplastic resin. As a result, they have successfully solved such problems by the membrane having voids therein which have a tortuosity of 1.0-6.0.

Namely, the present invention relates to a separation membrane characterized in that the separation membrane includes a thermoplastic resin and has voids therein which have a width of 1 nm-1,000 nm, and the voids have a tortuosity of 1.0-6.0.

The separation membrane and a method of producing thereof of the present invention are explained below.

1. Separation Membrane (1-1) Overview of Constitution of Separation Membrane

The separation membrane of the present invention includes a thermoplastic resin. The separation membrane includes a phase including the thermoplastic resin and has voids therein.

The separation membrane of the present invention preferably includes a thermoplastic resin (A) as a main component. The term "main component" herein means a component which is the highest in content by weight among all the components of a resin composition that constitutes the separation membrane. The proportion of the thermoplastic resin (A) in the separation membrane is preferably 50 wt % or more, more preferably 60 wt % or more, and still more preferably 70 wt % or more. The separation membrane may be substantially constituted of the thermoplastic resin (A) alone.

Examples of the thermoplastic resin include polyolefin resins such as polyethylene, polypropylene, and polymethylpentene, polyester resins such as polyethylene terephthalate, polybutylene terephthalate, and polylactic acid, polyamide resins such as nylon-6, nylon-66, and nylon-11, polyimide resins such as polyetherimides and polyimides, acrylic resins such as poly(meth)acrylates, polyether resins such as polyacetals and polyphenylene oxide, and polyphenylene sulfide, polyetheretherketones, polysulfones, polyvinyl acetate, and cellulose esters.

Hydrophilic resins are preferred, among these resins, as the thermoplastic resin according to the present invention from the standpoint that hydrophilic resins bring about satisfactory water permeability.

The term "hydrophilic resin" as used in the present invention means a polymer which contains a constituent component having a hydrophilic group and which gives a film having a contact angle with water of 90° or smaller. More preferred is a hydrophilic resin having a contact angle with water of 600 or smaller. The hydrophilic group herein is a hydroxyl group, carboxyl group, carbonyl group, amino group, or amide group.

The separation membrane may contain a plasticizer (B), a structure-forming agent (C), etc., besides the thermoplastic resin (A).

The separation membrane may contain a liquid, e.g., water, therein for shape retention. In the following explanation, such liquids for shape retention are not regarded as a constituent element of the separation membrane.

(1-2) Composition

<Thermoplastic Resin (A)>

Examples of the thermoplastic resin (A) according to the present invention include polyesters, polyamides, polymethyl acrylate, polyvinyl acetate and cellulose esters. The thermoplastic resin (A) is preferably at least one member selected from the group consisting of polyesters, polyamides, and cellulose esters, among these.

Examples of the cellulose esters include cellulose acetate, cellulose propionate, cellulose butyrate, and a cellulose-mixed ester in which 3 hydroxyl groups present in a glucose unit of cellulose are blocked with two or more types of acyl groups. Specific examples of the cellulose-mixed ester include, for example, cellulose acetate propionate, cellulose acetate butyrate, cellulose acetate laurate, cellulose acetate oleate, and cellulose acetate stearate. Each cellulose-mixed ester exemplified has acetyl groups and other acyl groups (for example, a propionyl group, a butyryl group, a lauryl group, an oleyl group, a stearyl group, etc.). It is preferred that average degrees of substitution of the acetyl group and other acyl groups in the cellulose-mixed ester satisfy the following formulae. The average degree of substitution refers to the number of hydroxyl groups to which the acetyl group is chemically bonded, among 3 hydroxyl groups present per glucose unit of the cellulose.

1.0≤{(Average degree of substitution of acetyl group)+(Average degree of substitution of other acyl groups)}≤3.0

0.1≤(Average degree of substitution of acetyl group)≤2.6

0.1≤(Average degree of substitution of other acyl groups)≤2.6

When the above formulae are satisfied, the membrane achieving both the separation performance and the permeation performance is accomplished. Further, when the above formulae are satisfied, good thermal flowability of the resin composition is likely to be accomplished during melt spinning, in the production of the separation membrane.

It is preferable that the separation membrane of the present invention includes at least one compound selected from the group consisting of cellulose acetate propionate and cellulose acetate butyrate, among those cellulose esters. The inclusion of either or both of the cellulose esters makes it easy to form the voids, that will be described later, which have a tortuosity within a given range.

In the present invention, a weight average molecular weight (Mw) of the cellulose ester is preferably 50,000 to 250,000. When the weight average molecular weight (Mw) is 50,000 or more, thermal decomposition during melt spinning can be prevented, and the membrane strength of the separation membrane can reach a practical level, and thus Mw of 50,000 or more is preferred. When the weight average molecular weight (Mw) is 250,000 or less, a melt viscosity can be prevented from being excessively high and stable melt spinning is performed, and thus Mw of 250,000 or less is preferred.

The weight average molecular weight (Mw) is more preferably 60,000 to 220,000, and still more preferably 80,000 to 200,000. Here, the weight average molecular weight (Mw) is a value calculated by GPC measurement and will be described in detail in Examples.

Examples of the polyamides include various kinds of polyamides obtained by the ring-opening polymerization of various lactams, the polycondensation of various diamines with various dicarboxylic acids, and the polycondensation of various aminocarboxylic acids, and further include co-polymerized polyamides obtained by a combination of two or more of these ring-opening polymerization and polycondensation reactions. Specific examples of the above polyamides and co-polymerized polyamides include, but are not limited to, nylons such as nylon-6, nylon-66, nylon-610, nylon-46, nylon-612, nylon-11, nylon-12, nylon-6/12 copolymers (copolymers of r-caprolactam and laurolactam), and nylon-6/66 copolymers (copolymers of r-caprolactam and hexamethylenediamine/adipic acid nylon salt). Two or more of these polyamides may be kneaded together and used.

The separation membrane may include one polyamide compound as the only polyamide, or may include two or more polyamide compounds.

It is especially preferable that the separation membrane includes nylon-6 and/or nylon-66 among the polyamides shown above as examples. Inclusion of either or both of these polyamides makes it possible to obtain a separation membrane having high separation performance.

The weight average molecular weight (Mw) of the polyamide is preferably 10,000-1,000,000. Weight average molecular weights (Mw) of 10,000 or higher are preferred in that the polyamide can be inhibited from thermally decomposing during melt spinning and the separation membrane can have a practical level of membrane strength. Weight average molecular weights (Mw) of 1,000,000 or less are preferred in that the polyamide can be inhibited from having too high a melt viscosity and can be stably melt-spun. The weight average molecular weight (Mw) thereof is more preferably 20,000-900,000, and still more preferably 30,000-800,000.

Since a polyamide contains amide bonds formed by the polymerization, the main chain thereof is less apt to suffer cleavage even upon contact with, in particular, alkalis. Polyamides hence have satisfactory resistance to alkalis and are preferred in this respect.

Examples of the polyesters include polyesters each including glycol moieties and dicarboxylic acid moieties, polylactic acid-based polymers, and the like. The separation membrane may include one polyester compound as the only polyester, or may include two or more polyester compounds.

With respect to the polyesters each including glycol moieties and dicarboxylic acid moieties, the glycol moieties are preferably glycols having 18 or less carbon atoms, more preferably glycols having 10 or less carbon atoms, and still more preferably glycols having 5 or less carbon atoms, from the standpoint of permeation performance. The number of carbon atoms of each glycol moiety is preferably 2 or more from the standpoint of imparting enhanced resistance to alkali hydrolysis. Specific examples include aliphatic dihydric alcohols such as ethylene glycol, 1,2-propylene glycol, 1,2-butanediol, 1,3-butanediol, 1,4-butanediol, 2-methyl-1, 3-propanediol, neopentyl glycol, 1,5-pentanediol, 1,6-hexanediol, 2,2-diethyl-1,3-propanediol, 2,2,4-trimethyl-1, 3-pentanediol, 2-ethyl-1,3-hexanediol, 1,9-nonanediol, 1,10-decanediol, 2-butyl-2-ethyl-1,5-propanediol, and 1,12-octadecanediol and polyalkylene glycols such as dipropylene glycol. One of these glycols may be used alone, or two or more thereof may be used in combination.

Examples of the dicarboxylic acid moieties include terephthalic acid, isophthalic acid, naphthalenedicarboxylic acid, or the like, and are not particularly limited. However, use of terephthalic acid can give a resin having enhanced crystallinity, making it possible to obtain a separation membrane having excellent mechanical properties and excellent handleability. Use of isophthalic acid can inhibit excess crystallization, making it possible to obtain satisfactory permeation performance. Regardless of whether one dicarboxylic acid is used or two or more dicarboxylic acids are used in combination, the effect of the present invention can be satisfactorily exhibited.

It is preferable that the separation membrane includes, in particular, a polylactic acid-based polymer and/or polyethylene terephthalate among the polyesters described above as examples. The inclusion of either or both of these polyesters renders a separation membrane having high separation performance possible.

The weight average molecular weight (Mw) of the polyester including glycol moieties and dicarboxylic acid moieties is preferably 10,000-1,000,000. Weight average molecular weights (Mw) thereof of 10,000 or higher are preferred in that the polyester can be inhibited from thermally decomposing during melt spinning and the separation membrane can have a practical level of membrane strength. Weight average molecular weights (Mw) thereof of 1,000,000 or less are preferred in that the polyester can be inhibited from having too high a melt viscosity and can be stably melt-spun. The weight average molecular weight (Mw) thereof is more preferably 20,000-900,000, and still more preferably 30,000-800,000.

The separation membrane of the present invention may include one compound as the thermoplastic resin (A) or may include two or more compounds as the thermoplastic resin (A). Namely, the separation membrane includes at least one compound selected, for example, from the group consisting of the thermoplastic resins enumerated in this description.

It is preferable that the separation membrane of the present invention includes at least one compound selected from the group consisting of the cellulose esters, the polyamides, and the polyesters among the thermoplastic resins shown above as examples.

<Plasticizer (B)>

The separation membrane of the present invention may contain a plasticizer (B). When a plasticizer (B) is contained in the resin composition used in membrane formation in production, after the thermoplastic resin (A) has been thermoplasticized in the production of the membrane, the plasticizer (B) may remain in the separation membrane or at least a part of the plasticizer (B) may be eluted from the separation membrane. The plasticizer thus eluted may leave pores in the membrane, resulting in better permeation performance.

When total weight of all components constituting the membrane is taken as 100 wt %, the content of the plasticizer (B) in the separation membrane is not particularly limited, and it is, for example, 40 wt % or less. The content of the plasticizer (B) is more preferably 1 wt % to 35 wt %, still more preferably 3 wt % to 35 wt %, yet still more preferably 5 wt % to 35 wt %, and especially preferably 10 wt % to 30 wt %.

Details of the plasticizer (B) will be described later.

<Structure-Forming Agent (C)>

The separation membrane of the present invention may contain a structure-forming agent (C).

When total weight of all components constituting the membrane is taken as 100 wt %, the content of the structure-forming agent (C) in the separation membrane is preferably 5 wt % to 60 wt %. The content of the structure-forming agent (C) is more preferably 50 wt % or less.

Details of the structure-forming agent (C) will be described later.

<Antioxidant (D)>

The separation membrane of the present invention may contain an antioxidant (D). Particularly, it is preferable to contain a phosphorus-based antioxidant, especially preferably a pentaerythritol-based compound, as the antioxidant (D). Specific examples of the pentaerythritol-based compound include bis (2,6-di-t-butyl-4-methylphenyl) pentaerythritol diphosphite.

In a case where the phosphorus-based antioxidant is contained, thermal decomposition during melt spinning is prevented. As a result, it becomes possible to improve the membrane strength and to prevent the membrane from being colored. The content of the antioxidant (D) is preferably 0.500 wt % or less relative to a composition for melt spinning.

(1-3) Shape of Separation Membrane

Although the shape of the separation membrane of the present invention is not particularly limited, a separation membrane in a hollow fiber shape (hereinafter also referred to as a "hollow fiber membrane") or a membrane in a planner shape (hereinafter also referred to as a "flat membrane") is preferably adopted. Of these, the hollow fiber membrane is more preferred, because it is possible to be efficiently filled in a module, thereby being able to enlarge an effective membrane area per unit volume of the module. The hollow fiber membrane is a fibrous membrane having a hollow.

From a viewpoint of improving the permeation performance, a thickness of the separation membrane is preferably 1 μm to 1000 μm, more preferably 1 μm to 500 μm, still more preferably 2 μm to 400 μm, especially preferably 20 μm to 200 μm, and most preferably 50 μm to 150 μm.

In a case of the hollow fiber membrane, from a viewpoint of achieving both the effective membrane area at a time of being filled in the module and the membrane strength, an outer diameter of the hollow fiber membrane is preferably 50 μm to 5,000 μm, more preferably 100 μm to 5,000 μm, still more preferably 200 μm to 4,000 μm, especially preferably 300 μm to 700 jam, and most preferably 400 μm to 700 μm.

In addition, in the case of the hollow fiber membrane, in view of a relationship between a pressure loss of a fluid flowing through a hollow part and a buckling pressure, the percentage of hollowness of the hollow fiber membrane is preferably 15% to 70%, more preferably 20% to 65%, and still more preferably 25% to 60%.

A method for adjusting the outer diameter or the percentage of hollowness of the hollow fiber membrane to fall within the above-mentioned ranges is not particularly limited. For example, the adjustment can be made by appropriately changing a shape of a discharge outlet of a spinning spinneret for producing the hollow fiber or a draft ratio which can be calculated by a winding rate/discharge rate.

(1-4) Co-Continuous Structure

In the separation membrane of the present invention, it is preferable that a phase including the thermoplastic resin (A) and voids form a co-continuous structure.

For the composition of the phase including the thermoplastic resin, description on the composition of the separation membrane is applied.

Figure 1:
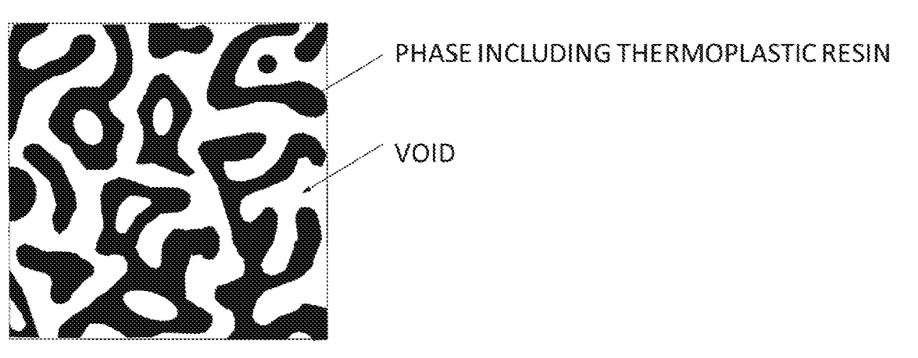
FIG. 1 is a cross-sectional view schematically showing a co-continuous structure of a separation membrane of the present invention.

Herein, the co-continuous structure refers to a state where the phase including the thermoplastic resin (A) and the voids are continuous and three-dimensionally intertwined with each other when a cross section of the membrane was observed with a transmission electron microscope (hereinafter "TEM") or a scanning electron microscope (hereinafter "SEM") (see FIG. 1).

A schematic diagram of the co-continuous structure is also described in, for example, "Polymer Alloy Foundation and Application (2nd Edition) (Chapter 10.1)" edited by the Society of Polymer Science: Tokyo Kagaku Dojin.

The width of the void refers to a period calculated from a wavenumber of a maximum peak of a graph, which is prepared as follows: an image observed with a transmission electron microscope or scanning electron microscope is Fourier transformed and the wavenumber is plotted on a horizontal axis and intensity is plotted on a vertical axis.

When the width of the void is 1 nm or more, good permeation performance can be exhibited. The width of the void is preferably 2 nm or more, more preferably 10 nm or more, still more preferably 20 nm or more, and especially preferably 30 nm or more. In addition, when the width of the void is 1,000 nm or less, good separation performance can be exhibited as a separation membrane. The width of the void is preferably 600 nm or less, more preferably 200 nm or less, still more preferably 100 nm or less, especially preferably 80 nm or less, and most preferably 50 nm or less. In this description, the width of the void is sometimes simply referred to as a pore diameter.

Generally, a porous body having the co-continuous structure has higher pore diameter uniformity than a porous body made of aggregates of particles.

The pore diameter uniformity can be determined based on a peak half width of a curve obtained by plotting a pore diameter on the horizontal axis and the number of pores having the pore diameter on the vertical axis. Namely, in a case of a membrane having a uniform pore diameter, the curve forms a sharp peak, and the half width becomes narrow. On the other hand, in a case of having a non-uniform pore diameter, the curve forms a broad peak and the half width becomes wide. Since the pore diameter uniformity evaluation by the peak half width of the graph plotting the pore diameter on the horizontal axis and the number of pores on the vertical axis can be the same as an evaluation in which a reciprocal of the pore diameter, namely the wavenumber, is plotted on the horizontal axis, the evaluation is made by using the graph obtained by Fourier transforming the above described electron microscope image.

The microscopic image is captured in a square visual field with a side having a length 10 times to 100 times the width of the void. In addition, the peak half width and the peak maximum wavenumber of the graph, in which the wavenumber is plotted on the horizontal axis of the Fourier transformed graph and the intensity is plotted on the vertical axis, are determined.

Since the peak half width tends to increase as the peak maximum wavenumber increase, a value of (a)/(b), calculated from the peak half width (a) and the peak maximum wavenumber (b), is used as an index of the pore diameter uniformity evaluation.

In order to exhibit an excellent separation property, a higher pore diameter uniformity is preferred, and the value of (a)/(b) is preferably 1.5 or less, more preferably 1.2 or less, and still more preferably 1.0 or less. Since higher uniformity in the pore structure is preferable, from a viewpoint of separation performance, (a)/(b) is a value larger than 0, although a lower limit value thereof is not particularly limited.

Details of a method for determining the pore diameter will be described in Examples.

(1-5) Tortuosity

The separation membrane of the present invention has a tortuosity of 1.0-6.0. Though it is preferred for the tortuosity to be low as much as possible, a lower limit thereof is 1.0 in theory. When the tortuosity thereof is 6.0 or less, channels have improved linearity, resulting in satisfactory water permeability. The tortuosity thereof is preferably 2.0-6.0, more preferably 3.0-5.5, and still more preferably 3.0-4.5.

The values of tortuosity shown in this description are ones determined through a measurement and a calculation which were made under the conditions that will be described later in Examples.

<Opening Ratio>

The separation membrane of the present invention preferably has a surface opening ratio (hereinafter "opening ratio") of 10% to 70%. When the opening ratio is 10% or more, a good permeation flux is obtained, and when the opening ratio is 70% or less, a good membrane strength is obtained. The opening ratio is more preferably 15% to 60%, still more preferably 20% to 50%, yet still more preferably 20% to 45%, especially preferably 20% to 40%, and most preferably 25% to 35%.

The opening ratio is a ratio of the voids area to an observed area when the surface is observed, and is represented as opening ratio (%)=the voids area in the surface/the observed area×100.

The values of opening ratio shown in this description are ones determined through a measurement with a scanning electron microscope and a calculation which were made under the conditions that will be described later in Examples.

<Membrane Permeation Flux>

The separation membrane of the present invention preferably has a membrane permeation flux of 0.01 $m^3/m^2/hr$ to 20 $m^3/m^2/hr$ at 50 kPa and 25° C. The membrane permeation flux is more preferably 0.05 $m^3/m^2/hr$ to 15 $m^3/m^2/hr$; still more preferably 0.1 $m^3/m^2/hr$ to 10 $m^3/m^2/hr$, especially preferably 0.2 $m^3/m^2/hr$ to 7 $m^3/m^2/hr$, and most preferably 0.5 $m^3/m^2/hr$ to 5 $m^3/m^2/hr$. In cases when the voids have a width of 1-80 nm, the membrane permeation flux is preferably 0.70 $m^3/m^2/hr$ to 20 $m^3/m^2/hr$, and more preferably 0.75 $m^3/m^2/hr$ to 15 $m^3/m^2/hr$. In cases when the voids have a width of 80-100 nm, the membrane permeation flux is preferably 1.0 $m^3/m^2/hr$ to 20 $m^3/m^2/hr$, and more preferably 1.1 $m^3/m^2/hr$ to 15 $m^3/m^2/hr$. In cases when the voids have a width of 100-1,000 nm, the membrane permeation flux is preferably 1.0 $m^3/m^2/hr$ to 20 $m^3/m^2/hr$, and more preferably 1.5 $m^3/m^2/hr$ to 20 $m^3/m^2/hr$. Measurement conditions of the membrane permeation flux will be described in detail in Examples.

<Additives>

The separation membrane of the present invention may contain additives other than the substances described above, as far as not impairing the effect of the present invention. For example, an organic lubricant, a crystal nucleating agent, organic particles, inorganic particles, a terminal blocking agent, a chain extender, an ultraviolet absorber, an infrared absorber, an anti-coloring agent, a delustering agent, an antimicrobial agent, an antielectricity agent, a deodorant, a flame retardant, a weathering agent, an antistatic agent, an antioxidant, an ion-exchanging agent, an antifoaming agent, a color pigment, a fluorescent whitening agent, a dye, and so on can be used as an additive.

<Use of Separation Membrane>

The separation membrane of the present invention can be used particularly for water treatment. Specific examples of a water treatment membrane include a microfiltration membrane and an ultrafiltration membrane. The separation membrane of the present invention is particularly preferably applied to the ultrafiltration membrane.

<Module>

The separation membrane of the present invention may be incorporated into a separation membrane module when used. The separation membrane module includes, for example, a membrane bundle constituted of a plurality of hollow fiber membranes and a case accommodating this membrane bundle therein.

So far as a flat membrane is concerned, it is fixed to a support, or the membranes are stuck to each other to form an envelope-shaped membrane, and further installed to a water collection tube or the like as needed, thereby achieving modularization.

2. Production Method

Next, the method for producing the resin composition and the separation membrane of the present invention will be specifically described with reference to a case where the resin composition and the separation membrane are a hollow fiber and a hollow fiber membrane, respectively, but is not limited thereto.

As the method for producing the resin composition and the separation membrane of the present invention, a melt spinning method is preferably applied.

The melt spinning method is a formation method of the resin composition and the membrane including a step of melting and kneading raw materials by heating to prepare a molten resin (a resin melting step); and a step of subsequently discharging this molten resin from a slit-shaped spinning spinneret, followed by cooling for solidification (a molding step). The melt spinning method is applicable to the production of both of a hollow fiber and a hollow fiber membrane.

Examples of the raw materials of the resin composition and the separation membrane include the thermoplastic resin (A), the plasticizer (B), the structure-forming agent (C), and the antioxidant (D). Specific examples of the respective raw materials are those as described above. The above raw materials are heated and melted to have a temperature equal to or higher than a melting point of each raw material, and are melted and kneaded using a single screw extruder, a twin screw extruder or the like to prepare a resin composition.

In particular, the present invention provides a method for producing the separation membrane, including: a resin melting step of melting and kneading a thermoplastic resin and a structure-forming agent to prepare a molten resin; a molding step of discharging the molten resin from a discharge spinneret to obtain a membrane-shaped molded product; a co-continuous structure forming step of forming a co-continuous structure by heat-induced phase separation in the molded product; and an eluting step of eluting the structure-forming agent from the resin composition to form voids.

(Resin Melting Step)

The resin melting step is a step of preparing the molten resin for use in melting membrane formation. Formations of the flat membrane and the hollow fiber membrane are included in the melting membrane formation. Formation of the hollow fiber membrane is particularly called melt spinning.

[Raw Materials]

The raw materials of the molten resin (namely, materials used in the resin melting step) contain at least the thermoplastic resin (A) and the structure-forming agent (C), and may further contain the plasticizer (B) and the antioxidant (D).

Examples of the thermoplastic resin (A) are as described above.

The content of the thermoplastic resin (A) in the total amount of the raw materials is preferably 20 wt % to 90 wt %. When the content of the thermoplastic resin (A) is 20 wt % or more, a membrane having a high strength can be achieved. When the content of the thermoplastic resin (A) is 90 wt % or less, melt molding by addition of a plasticizer or the like becomes easy, and good stringing property can be imparted. The content of the thermoplastic resin (A) is more preferably 30 wt % to 85 wt %, and still more preferably 40 wt % to 80 wt %.

The plasticizer (B) is not particularly limited, as long as it is a compound which thermoplasticizes the thermoplastic resin (A), namely, makes the same meltable. In addition, the plasticizer (B) may be used alone or in combination of two or more. As the plasticizer (B) in the present invention, preferred is a polyhydric alcohol-based compound. Specifically, examples of the polyhydric alcohol-based compound include polyalkylene glycols, glycerin-based compounds, caprolactone-based compounds, and derivatives thereof.

Of these, the polyalkylene glycols are preferred since the polyalkylene glycols have good compatibility with the thermoplastic resin (A) and thus exhibit thermoplasticity even with addition in small amounts, in terms of preventing a decrease in the membrane strength due to the plasticizer.

Specific examples of the polyalkylene glycols include polyethylene glycol (hereinafter "PEG"), polypropylene glycol, and polybutylene glycol, each having a weight-average molecular weight (Mw) of 200 to 2,000.

The content of the plasticizer (B) in the raw materials of the molten resin is preferably 3 wt % to 50 wt %. When the content of the plasticizer (B) is 3 wt % or more, the thermoplasticity of the thermoplastic resin (A) is good. When the content of the plasticizer (B) is 50 wt % or less, the spinnability is good. The content of the plasticizer (B) is more preferably 5 wt % to 40 wt %, and still more preferably 7 wt % to 30 wt %.

The structure-forming agent (C) may be any substance as long as it is partially compatible with the mixture of thermoplastic resin and a plasticizer thereof, and can be eluted or decomposed with a solvent that does not dissolve the thermoplastic resin.

Partial compatibility means that two or more substances are perfectly compatible under certain conditions but are separated in phases under different conditions. The structure-forming agent is a substance that undergoes phase separation from the thermoplastic resin by being placed under specific temperature conditions in the co-continuous structure forming step as described later. Specific conditions will be described later.

Specific examples of the structure-forming agent (C) include polyvinylpyrrolidone (hereinafter "PVP"), copolymers containing PVP such as a PVP/vinyl acetate copolymer and a PVP/methyl methacrylate copolymer, polyvinyl alcohol, or polyester-based compounds. These can be used either alone or in combination thereof. When thermal crosslinking occurs in PVP, it becomes difficult to remove the structure-forming agent (C) as described later. It is hence preferred to use PVP having a relatively low molecular weight of 20,000 or less, which is relatively less apt to undergo intermolecular crosslinking and can be eluted even after having crosslinked. The use of a copolymer of, for example, vinylpyrrolidone and vinyl acetate is also preferred from the viewpoint of reducing thermal crosslinking.

The content of the structure-forming agent (C) during melt spinning in the total amount of the raw materials of the molten resin is preferably 10 wt % to 60 wt %. When the content of the structure-forming agent (C) is 10 wt % or more, the thermoplastic resin phase and the structure-forming agent phase easily form a co-continuous structure having a periodic structure of 1 nm to 1000 nm in the co-continuous structure forming step as described later. When the content of the structure-forming agent (C) is 60 wt % or less, it is possible to prevent an excessive increase in the width of the second phase, which is partially compatible with the first phase, which includes the thermoplastic resin, in the resin composition.

The ratio of the total content of the plasticizer (B) and the structure-forming agent (C) in the total amount of the raw materials of the molten resin is preferably 13 wt % to 80 wt %. When the total content of the plasticizer (B) and the structure-forming agent (C) is 13 wt % or more, good spinnability and co-continuous structure are obtained. When the total content of the plasticizer (B) and the structure-forming agent (C) is 80 wt % or less, a resin composition and a separation membrane having a good strength are obtained. The total content of the plasticizer (B) and the structure-forming agent (C) is more preferably 20 wt % to 70 wt %, and still more preferably 30 wt % to 60 wt %.

Preventing an excessive increase in the thickness of the phase having the structure-forming agent in the resin composition also has an effect of preventing an excessive increase in the width of the voids of the separation membrane, resulting in good separation performance. The content of the structure-forming agent (C) is more preferably 15 wt % to 55 wt %, and still more preferably 20 wt % to 50 wt %.

The content of the antioxidant (D) in the total amount of the raw materials of the separation membrane is preferably 0.005 wt % to 0.500 wt % relative to the composition to be subjected to melt spinning.

Since the molten resin does not contain a solvent or has a solvent content of 20 wt % or less, there is no compositional change as a whole even after the molding step as described later. Therefore, structure formation by heat treatment becomes easy in the co-continuous structure forming step as described later.

(Molding Step)

The molding step is a step of molding the molten resin into a desired shape such as a hollow fiber shape or a flat membrane shape. The molten resin that has undergone the molding step is referred to as a "molded product".

In the case where the molten resin, which is prepared as above and includes the thermoplastic resin (A), is formed into a hollow fiber by the melt spinning method, the spinning temperature (the temperature of the spinning pack) is preferably (Tm+5° C.) to (Tm+50° C.). Tm is a crystal melting temperature of this molten resin in temperature rise measurement with a differential scanning calorimeter (DSC). Measurement conditions of DSC will be described in detail in Examples.

The spinning temperature is more preferably (Tm+5° C.) to (Tm+40° C.), and still more preferably (Tm+5° C.) to (Tm+30° C.). By keeping this spinning temperature lower than usual, the strength of the resin composition and the separation membrane is increased.

In preparing the molded product having a hollow fiber shape, a spinning spinneret can be used as a discharge spinneret. Specifically, a spinning spinneret of a C-shaped slit, a spinning spinneret having one discharge outlet formed by arranging a plurality of (2 to 5) arcuate (arc-shaped) slit parts, a tube-in orifice type spinning spinneret, and so on can be used.

The molten resin is extruded downwards from the discharge outlet of the spinning spinneret which is attached in a lower part of the spinning pack. Herein, a distance H from the lower surface of the spinning spinneret to the upper end of a cooling apparatus (chimney) is preferably 0 mm to 500 mm, more preferably 0 mm to 400 mm, and still more preferably 0 mm to 300 mm.

When the hollow fiber discharged from the spinning spinneret is cooled, a temperature of the cooling air of the cooling apparatus (chimney) is preferably 5° C. to 80° C. In addition, an air speed of the cooling air is preferably 0.1 m/sec to 2.0 m/sec, more preferably 0.3 m/sec to 2.0 m/sec, and still more preferably 0.5 m/sec to 2.0 m/sec.

The hollow fiber cooled with the cooling apparatus is wound by a winder. The draft ratio, which can be calculated by a winding rate/discharge rate, is preferably 1 to 1,000, more preferably 20 to 900, and still more preferably 30 to 800.

(Co-Continuous Structure Forming Step)

The co-continuous structure forming step is carried out after the molding step.

In order to form the co-continuous structure, namely, a structure in which the first phase, which includes the thermoplastic resin, and the second phase, which is partially compatible with the first phase, are continuous and intertwined with each other, phase separation can be used. The phase separation is induced when the temperature of a composition in which the thermoplastic resin and the structure-forming agent are compatible falls within a specific range. The phase separation induced under certain temperature condition within a specific range is called heat-induced phase separation. For a temperature within the specific range, it is preferable to set the temperature to be from a glass transition temperature to a spinodal line.

Namely, the co-continuous structure forming step is carried out by setting the temperature of the molded product within the specific range. The specific range is preferably 40° C. to 250° C., more preferably 50° C. to 220° C., still more preferably 60° C. to 200° C., and especially preferably 70° C. to 180° C. By using a liquid as a heat medium in setting the temperature of the molded product within the specific range, a structure having a low tortuosity is obtained. The liquid to be used as a heat medium is not particularly limited, and examples thereof include water, silicone oil, N-methylpyrrolidone (hereinafter "NMP"), liquid paraffin, PEG, and polymer melts. It is preferred to use a liquid having a high boiling point, such as silicone oil, liquid paraffin, PEG, or a polymer melt, among these. It is thought that in the co-continuous structure forming step, the temperature of the molded product becomes the same as the temperature of the heat medium. The temperature range for the molded product hence applies also to the heat medium.

In order to obtain the co-continuous structure, particularly, phase separation by spinodal decomposition is preferably used. At the time of obtaining the co-continuous structure, it is preferable that the thermoplastic resin and the structure-forming agent are once compatible with each other before phase separation and undergo phase separation by spinodal decomposition to form the structure. In this way, a resin composition in which the second phase has a uniform width can be obtained.

(Eluting Step)

At least a part of the second phase is removed (eluted) after the co-continuous structure forming step to form voids.

Removal of the second phase is carried out, for example, by immersing the molded product in a solvent, which does not dissolve or decompose the thermoplastic resin (A) but can dissolve or decompose the structure-forming agent. Such treatment is called an eluting step.

In the eluting step, examples of the solvent include an acidic aqueous solution, an alkaline aqueous solution, water, alcohols, and an aqueous alcohol solution.

It is preferable to hydrophilize the surface of the hollow fiber membrane by, for example, an alcohol-containing aqueous solution, an alkaline aqueous solution or the like before the membrane is used.

In this way, the separation membrane of the present invention which includes a phase including the thermoplastic resin and has voids having a given width and which has a given tortuosity can be produced.

EXAMPLES

The present invention is more specifically described below by showing Examples.

However, the present invention should not be construed as being restricted thereby in any way.

[Measurement and Evaluation Methods]

The respective characteristic values in Examples were determined by the following methods.

(1) Average Degrees of Substitution for Cellulose Ester

A method for calculating the average degrees of substitution for a cellulose ester in which acetyl groups and acyl groups are bonded to cellulose is as follows.

A cellulose ester was dried at 80° C. for 8 hours, weighed for 0.9 g, and dissolved by adding 35 mL of acetone and 15 mL of dimethyl sulfoxide. Subsequently, 50 mL of acetone was further added thereto. 30 mL of a 0.5 N aqueous solution of sodium hydroxide was added while stirring, followed by saponification for 2 hours. Then, 50 mL of hot water was added to wash a side surface of a flask. Thereafter, titration was performed with 0.5 N sulfuric acid using phenolphthalein as an indicator. Separately, a blank test was performed by the same method as for the sample. After the completion of the titration, a supernatant of the solution was diluted to 100 times, and the compositions of organic acids were determined using an ion chromatograph. From the determination and the results of acid composition analysis by the ion chromatograph, the degrees of substitution were calculated by the following formulae.

$$TA = (B-A) \times F/(1000 \times W)$$

$$DSace = (162.14 \times TA)/[\{1-(Mwace-(16.00+1.01)) \times TA\} + \{1-(Mwacy-(16.00+1.01)) \times TA\} \times (Acy/Ace)]$$

$$DSacy = DSace \times (Acy/Ace)$$

TA: Total organic acid amount (mL)
A: Sample titration amount (mL)
B: Blank test titration amount (mL)
F: Titer of sulfuric acid
W: Sample weight (g)
DSace: Average degree of substitution of acetyl groups
DSacy: Average degree of substitution of acyl groups
Mwace: Molecular weight of acetic acid Mwacy: Molecular weight of other organic acids Acy/Ace: Molar ratio of acetic acid (Ace) and other organic acids (Acy)

162.14: Molecular weight of a repeating unit of cellulose 16.00: Atomic weight of oxygen 1.01: Atomic weight of hydrogen (2) Weight Average Molecular Weight (Mw) of Thermoplastic Resin A thermoplastic resin was completely dissolved in tetrahydrofuran or NMP to a concentration of 0.15 wt % to prepare a sample for GPC measurement. Using this sample, GPC measurement was performed with Waters 2690 under the following conditions to determine the weight average molecular weight (Mw) in terms of polystyrene conversion.

Column: Two TSK gel GMHHR-H columns (manufactured by Tosoh Corporation) were connected to each other.

Detector: Waters 2410, differential refractometer RI

Solvent for mobile phase: Tetrahydrofuran or NMP

Flow rate: 1.0 mL/min

Injection amount: 200 μL (3) Outer Diameters (μm) of Hollow Fiber Membrane

Cross-sections in a direction perpendicular to a lengthwise direction of a hollow fiber membrane (in a fiber diameter direction) and in a thickness direction of the membrane were observed and photographed by an optical microscope, and the outer diameter (μm) of the hollow fiber membrane was calculated. The outer diameter of the hollow fiber membrane was calculated using 10 hollow fiber membranes, and the average value thereof was taken as the outer diameter.

Since the hollow fiber is a molded product and resin composition, the hollow fiber may be referred to as "resin composition" hereinafter.

(4) Thicknesses of Hollow Fiber Membrane

A cross-section in a fiber diameter direction of a hollow fiber membrane was observed and photographed by an optical microscope, and thicknesses of 6 locations of a hollow fiber membrane were measured. This measurement was performed on 10 hollow fiber membranes, and the average value was taken as the thickness of the hollow fiber membrane.

(5) Percentages of Hollowness (%) of Hollow Fiber Membrane

A cross-section in a fiber diameter direction of a hollow fiber membrane was observed and photographed by an optical microscope, and a total area Sa of the cross-section and the hollow part area Sb were measured. The percentage of hollowness was calculated using the following formula. The percentage of hollowness was calculated using 10 hollow fiber membranes, and the average value thereof was taken as the percentage of hollowness.

$$\text{Percentage of hollowness (\%)} = (Sb/Sa) \times 100$$

(6) Width (Nm) of Void in Separation Membrane

Pre-treatment (TEM): Ultra-thin sections were cut out in a direction perpendicular to a lengthwise direction of a separation membrane.

Pre-treatment (SEM): A separation membrane obtained by carrying out the eluting step was frozen in liquid nitrogen, then a stress was applied to cleave the membrane so as to expose a cross-section in a direction perpendicular to a lengthwise direction of the separation membrane, and sputtering was carried out with platinum.

Observation:

The cross-section in the direction perpendicular to the lengthwise direction of the separation membrane was observed using a TEM or an SEM at a magnification of 10,000 to 100,000, and an image of one visual field was obtained. When the void had a width which is too small to observe by SEM, observation was carried out by TEM. A square image was cut out from the obtained image and Fourier transformed, and then a graph is plotted with wavenumber on a horizontal axis and intensity on a vertical axis. A period was calculated from the wavenumber of a maximum peak and this period was taken as the width of the void of the visual field. When the maximum peak was not obtained, the observation magnification was suitably adjusted and the cross-section was observed again to calculate the width of the void. When the obtained width of the void and one side of the square image did not satisfy the relationship of Formula (2), the size of the above-described square was changed and adjusted so as to satisfy the relationship of Formula (2), thereby calculating the width of the void. An observation location includes the vicinity of both surfaces, and 10 locations at equal intervals in a membrane thickness direction were taken, and the width of the void was calculated at each observation location. A numerical value of the observation position where the width of the void was the smallest among them was taken as the width of the void.

$$\text{Width of Void} \times 10 \leq \text{Side of Square} \leq \text{Width of Void} \times 100 \quad \text{Formula (2)}$$

(7) Permeation Performance (Membrane Permeation Flux ($m^3/m^2/h$))

Distilled water was sent over 30 minutes under conditions of a temperature of 25° C. and a filtration differential pressure of 50 kPa, and the amount ($m^3$) of permeated water obtained was measured and converted into values per unit time (h) and per unit membrane area ($m^2$), and the obtained value was taken as the permeation performance of pure water (unit=$m^3/m^2/h$). In Examples, a small module having four hollow fiber membranes and having an effective length of 200 mm was produced and membrane filtration treatment was carried out in the internal pressure mode. Therefore, the unit membrane area was calculated from the average inner diameter and the effective length of the hollow fiber membrane.

(8) Calculation of Peak Half Width (a)/Peak Maximum Wavenumber (b)

A cross-section in a direction perpendicular to a lengthwise direction of a resin composition or a separation membrane was observed using a TEM or an SEM at a magnification of 10,000 to 200,000, and an image was obtained. In the obtained image, a square area, one side of which is 10 to 100 times the width of the second phase of the resin composition or the width of the void of the separation membrane, is appropriately selected and is Fourier transformed, and a graph is plotted with wavenumber on a horizontal axis and intensity on a vertical axis. From the peak wavenumber and half width of the graph, (a)/(b), an index of average pore diameter and uniformity, was determined.

(9) Crystal Melting Temperature (° C.) of Resin Composition

The molten resin prepared above was rapidly cooled and solidified to use as a sample. Using a differential scanning calorimeter DSC-6200, manufactured by Seiko Instruments Inc., about 5 mg of the sample, which was dried in vacuum at 25° C. for 8 hours, was set in an aluminum tray, increased in temperature from −50° C. to 350° C. at a temperature rising rate of 20° C./min, and thereafter held in a molten state for 5 minutes while keeping 350° C. A crystal melting peak observed at this time was taken as the crystal melting temperature (° C.). When a plurality of crystal melting peaks appeared, the crystal melting peak which appeared on the highest temperature side was employed.

(10) Opening Ratio (%)

After pre-treatment of a separation membrane by sputtering with platinum, the surface of the separation membrane was observed at a magnification of 10,000 to 200,000 using a scanning electron microscope to obtain an image. The obtained image was cut out into a square with a side of 1 μm. The square was binarized and an area thereof was calculated using image analysis software, and then the area of the void was measured. The opening ratio was determined from Formula (3).

$$\text{Opening ratio}=\text{Area of Void/Observation Area}\times 100 \qquad \text{Formula (3)}$$

(11) Tortuosity (-)

The tortuosity of a hollow fiber membrane was calculated using the following Formula (4).

$$\text{Tortuosity}=V_P/S_{BET}\times/(\varepsilon/2k) \qquad \text{Formula (4)}$$

In Formula (4), $V_P$ is specific pore volume (m³/g), $S_{BET}$ is specific surface area (m²/g), ε is porosity (-), and k is permeability coefficient (m²).

$V_P/S_{BET}$ can be calculated by measuring $V_P$ and $S_{BET}$ by the BET adsorption method. For the BET adsorption measurement, BELSORP-mini II (manufactured by Microtrac-BEL Corp.) was used.

The porosity a was calculated using the following Formula (5).

$$\varepsilon=1-w/((R_o^2-R_i^2)\times\pi\times l\times\rho) \qquad \text{Formula (5)}$$

In Formula (5), w is dry weight (g), $R_o$ is outer diameter (m) of the hollow fiber membrane, $R_i$ is inner diameter (m) of the hollow fiber membrane, it is ratio of the circumference of a circle to its diameter, l is membrane length (m), and ρ is density of the thermoplastic resin (g/m³).

k was calculated using the following Formula (6).

$$k=(Q\times R_i\times\pi\cdot l\times\mu\times\ln(R_o/R_i))/(2\pi\times l\times P) \qquad (6)$$

In Formula (6), Q is membrane permeation flux (m³/m²/s), t is viscosity of water (Pa·s), $R_o$ is outer diameter (m) of the hollow fiber membrane, $R_i$ is inner diameter (m) of the hollow fiber membrane, π is ratio of the circumference of a circle to its diameter, l is membrane length (m), and P (Pa) is applied pressure.

[Thermoplastic Resin (A)]

Cellulose Ester (A1): Cellulose Acetate Propionate

To 100 parts by weight of cellulose (cotton linter), 240 parts by weight of acetic acid and 67 parts by weight of propionic acid were added, followed by mixing at 50° C. for 30 minutes. After the mixture was cooled to room temperature, 172 parts by weight of acetic anhydride cooled in an ice bath and 168 parts by weight of propionic anhydride were added as esterifying agents, and 4 parts by weight of sulfuric acid was added as an esterifying catalyst, followed by stirring for 150 minutes to carry out an esterification reaction. When the temperature exceeded 40° C. in the esterification reaction, cooling was carried out in a water bath. After the reaction, a mixed solution of 100 parts by weight of acetic acid and 33 parts by weight of water was added thereto as a reaction terminator for 20 minutes to hydrolyze excessive anhydrides. Thereafter, 333 parts by weight of acetic acid and 100 parts by weight of water were added, followed by heating and stirring at 80° C. for 1 hour. After the completion of the reaction, an aqueous solution containing 6 parts by weight of sodium carbonate was added. Cellulose acetate propionate precipitated was separated by filtration, subsequently washed with water, and thereafter dried at 60° C. for 4 hours, thereby obtaining a cellulose ester (A1) (cellulose acetate propionate). The average degrees of substitution of acetyl groups and propionyl groups of cellulose acetate propionate obtained were 1.9 and 0.7, respectively, and the weight average molecular weight (Mw) thereof was 178,000.

Polyamide (A2): Nylon-66 (nylon-66 resin "Amilan" (registered trademark), manufactured by Toray Industries, Inc.)

Polyamide (A3): Nylon-6 (nylon-6 resin "Amilan" (registered trademark), manufactured by Toray Industries, Inc.)

Plasticizer (B)

Plasticizer (B1): PEG, having a weight average molecular weight (Mw) of 600

Structure-forming Agent (C)

Structure-forming agent (C1): PVP (K17)

Structure-forming agent (C2): PVP/vinyl acetate copolymer (Kollidon VA 64 (BASF Japan Ltd.))

Antioxidant (D)

Antioxidant (D1): bis (2,6-di-t-butyl-4-methylphenyl) pentaerythritol diphosphite Antioxidant (D2): hindered phenol antioxidant (Irganox (registered trademark) 1098 (manufactured by BASF Ltd.))

Production of Resin Compositions and Separation Membranes

Example 1

57.3 wt % of cellulose ester (A1), 12.6 wt % of PEG (B1) having a weight average molecular weight (Mw) of 600 (manufactured by Sanyo Chemical Industries, Ltd.) as a plasticizer (B), 30.0 wt % of PVP (K17) (C1) (BASF Japan Ltd.), and 0.1 wt % of bis(2,6-di-t-butyl-4-methylphenyl) pentaerythritol diphosphite (D1) as an antioxidant (D) were melt-kneaded in a twin screw extruder at 240° C., were homogenized, and then were pelletized to obtain a resin for melt spinning. This resin was vacuum dried at 80° C. for 8 hours.

The dried resin was fed to the twin screw extruder and melted-kneaded at 230° C. to obtain a molten resin (a resin melting step). The molten resin was introduced into a melt spinning pack at a spinning temperature of 230° C., and spun downwards under conditions of a discharge rate of 10 g/min from an outer annular part of a spinneret having one hole (a double circular tube type, having a discharge outlet radius of 4.6 mm, and a slit width of 0.43 mm) (a molding step). The spun hollow fiber was introduced into a cooling apparatus (chimney) so that a distance H from a lower surface of the spinneret to an upper end of the cooling apparatus was 150 mm, and was wound by a winder at a draft ratio of 200, while cooling by cooling air at 25° C. and an air speed of 1.5 m/sec. The resultant hollow fiber was then heated in 180° C. PEG for 20 minutes.

The resin composition obtained was immersed in a 50% ethanol aqueous solution for 12 hours to elute the structure-forming agent, resulting in forming voids and carrying out hydrophilization. The hollow fiber which went through the ethanol treatment is taken as a "separation membrane" and physical properties thereof were determined. The results were shown in Table 1.

Examples 2 to 11 and Comparative Example 1

Separation membranes were obtained in the same manner as in Example 1, except that the composition of the resin composition for melt spinning and the production conditions were changed as shown in Table 1 or 2. Physical properties of the obtained separation membranes were shown in Table 1 or 2.

Example 12

52.3 wt % of polyamide (A2), 7.2 wt % of plasticizer (B1), 40.0 wt % of structure-forming agent (C2), and 0.5 wt % of antioxidant (D2) were melt-kneaded and homogenized with a twin screw extruder at 260° C. and then pelletized to obtain a resin for melt spinning. This resin was vacuum dried at 80° C. for 8 hours.

The dried resin was fed to the twin screw extruder and melted-kneaded at 240° C. to obtain a molten resin (a resin melting step). The molten resin was introduced into a melt spinning pack at a spinning temperature of 220° C., and spun downwards under conditions of a discharge rate of 10 g/min from an outer annular part of a spinneret having one hole (a double circular tube type, having a discharge outlet radius of 4.6 mm, and a slit width of 0.43 mm) (a molding step). The spun hollow fiber was introduced into a cooling apparatus (chimney) so that a distance H from a lower surface of the spinneret to an upper end of the cooling apparatus was 150 mm, wound by a winder at a draft ratio of 400 while cooling by cooling air at 25° C. and an air speed of 1.5 m/sec, and then heated in 180° C. PEG for 10 minutes.

The resin composition obtained was immersed in a 50% ethanol aqueous solution for 12 hours to elute the structure-forming agent, resulting in forming voids and carrying out hydrophilization. The hollow fiber which went through the ethanol treatment is taken as a "separation membrane" and physical properties thereof were determined. The results were shown in Table 2.

Example 13

A separation membrane was obtained in the same manner as in Example 12, except that the production conditions of the resin composition for melt spinning were changed as shown in Table 2. Physical properties of the obtained separation membrane were shown in Table 2.

Example 14

52.3 wt % of polyamide (A3), 7.2 wt % of plasticizer (B1), 40.0 wt % of structure-forming agent (C2), and 0.5 wt % of antioxidant (D2) were melt-kneaded and homogenized with a twin screw extruder at 260° C. and then pelletized to obtain a resin for melt spinning. This resin was vacuum dried at 80° C. for 8 hours.

The dried resin was fed to the twin screw extruder and melted-kneaded at 240° C. to obtain a molten resin (a resin melting step). The molten resin was introduced into a melt spinning pack at a spinning temperature of 220° C., and spun downwards under conditions of a discharge rate of 10 g/min from an outer annular part of a spinneret having one hole (a double circular tube type, having a discharge outlet radius of 4.6 mm, and a slit width of 0.43 mm) (a molding step). The spun hollow fiber was introduced into a cooling apparatus (chimney) so that a distance H from a lower surface of the spinneret to an upper end of the cooling apparatus was 150 mm, wound by a winder at a draft ratio of 400 while cooling by cooling air at 25° C. and an air speed of 1.5 m/sec, and then heated in 180° C. PEG for 10 minutes.

The resin composition obtained was immersed in a 50% ethanol aqueous solution for 12 hours to elute the structure-forming agent, resulting in forming voids and carrying out hydrophilization. The hollow fiber which went through the ethanol treatment is taken as a "separation membrane" and physical properties thereof were determined. The results were shown in Table 2.

Comparative Example 2

71.0 wt % of cellulose ester (A1), 20.0 wt % of polyethylene glycol (B1) having a weight average molecular weight of 600 (manufactured by Sanyo Chemical Industries, Ltd.) as a plasticizer (B), 8.9 wt % of PVP (K17) (C1) (BASF Japan Ltd.) as a structure-forming agent (B), and 0.1 wt % of bis(2,6-di-t-butyl-4-methylphenyl)pentaerythritol diphosphite (D1) as an antioxidant (D) were melt-kneaded in a twin screw extruder at 240° C., were homogenized, and then were pelletized to obtain a resin for melt spinning. This resin was vacuum dried at 80° C. for 8 hours.

The dried resin was fed to the twin screw extruder and melted-kneaded at 230° C. to obtain a molten resin (a resin melting step). The molten resin was introduced into a melt spinning pack at a spinning temperature of 200° C., and spun downwards under conditions of a discharge rate of 10 g/min from an outer annular part of a spinneret having 4 spinneret holes (a double circular tube type, having a discharge outlet radius of 4.6 mm, and a slit width of 0.43 mm) (a molding step). The spun hollow fibers were introduced into a cooling apparatus (chimney) so that a distance H from a lower surface of the spinneret to an upper end of the cooling apparatus was 150 mm, and were wound by a winder at a draft ratio of 200, while cooling by cooling air at 25° C. and an air speed of 0.5 m/sec (a co-continuous structure forming step). Physical properties of the hollow fiber (resin composition) thus obtained were shown in Table 2.

The resin composition obtained was immersed in a 50% ethanol aqueous solution for 12 hours to elute the structure-forming agent, resulting in forming voids and carrying out hydrophilization. The hollow fiber which went through the ethanol treatment is taken as a "separation membrane" and physical properties thereof were determined. The results were shown in Table 2.

Comparative Example 3

A hollow fiber (resin composition) and a separation membrane were obtained in the same manner as in Comparative Example 2, except that the composition of the resin composition for melt spinning and the production conditions were changed as shown in Table 2. Physical properties of the obtained hollow fiber and separation membrane were shown in Table 2.

TABLE 1

|  |  |  | Example 1 | Example 2 | Example 3 | Example 4 | Example 5 |
|---|---|---|---|---|---|---|---|
| Raw material composition | Thermoplastic resin (A) | wt % | 57.3 | 57.3 | 57.3 | 49.3 | 49.3 |
|  | Plasticizer (B) | wt % | 12.6 | 12.6 | 12.6 | 10.6 | 10.6 |
|  | Structure-forming agent (C) | wt % | 30.0 | 30.0 | 30.0 | 40.0 | 40.0 |
|  | Antioxidant (D) | wt % | 0.1 | 0.1 | 0.1 | 0.1 | 0.1 |

TABLE 1-continued

|  |  |  |  |  |  |  |  |
|---|---|---|---|---|---|---|---|
| Production conditions | Spinning temperature | ° C. | 230 | 230 | 230 | 230 | 230 |
|  | Draft ratio | — | 200 | 200 | 200 | 200 | 200 |
|  | Chimney air speed | m/sec | 1.5 | 1.5 | 1.5 | 1.5 | 1.5 |
|  | Heat treatment temperature | ° C. | 180 | 180 | 180 | 180 | 180 |
|  | Heat treatment time | min | 20 | 10 | 5 | 20 | 10 |
| Physical properties of separation membrane | Width of voids | nm | 98 | 61 | 47 | 123 | 75 |
|  | Outer diameter of hollow fiber membrane | μm | 500 | 490 | 490 | 470 | 440 |
|  | Thickness of hollow fiber membrane | μm | 91 | 91 | 91 | 85 | 76 |
|  | Percentage of hollowness of hollow fiber membrane | % | 40 | 40 | 40 | 41 | 43 |
|  | Tortuosity | — | 5.4 | 4.3 | 3.6 | 5.8 | 4.1 |
|  | Membrane permeation flux | m³/m²/h | 1.10 | 0.81 | 0.75 | 1.00 | 0.80 |
|  | (a)/(b) (of hollow fiber membrane) | — | 1.38 | 1.16 | 0.83 | 1.43 | 1.08 |
|  | Opening ratio | % | 28 | 25 | 21 | 28 | 23 |

|  |  |  | Example 6 | Example 7 | Example 8 | Example 9 | Example 10 |
|---|---|---|---|---|---|---|---|
| Raw material composition | Thermoplastic resin (A) | wt % | 41.1 | 31.1 | 31.1 | 22.9 | 22.9 |
|  | Plasticizer (B) | wt % | 8.8 | 8.8 | 8.8 | 17.0 | 17.0 |
|  | Structure-forming agent (C) | wt % | 50.0 | 60.0 | 60.0 | 60.0 | 60.0 |
|  | Antioxidant (D) | wt % | 0.1 | 0.1 | 0.1 | 0.1 | 0.1 |
| Production conditions | Spinning temperature | ° C. | 230 | 230 | 230 | 230 | 230 |
|  | Draft ratio | — | 200 | 200 | 200 | 200 | 200 |
|  | Chimney air speed | m/sec | 1.5 | 1.5 | 1.5 | 1.5 | 1.5 |
|  | Heat treatment temperature | ° C. | 180 | 180 | 180 | 180 | 180 |
|  | Heat treatment time | min | 10 | 10 | 15 | 10 | 15 |
| Physical properties of separation membrane | Width of voids | nm | 86 | 95 | 187 | 113 | 546 |
|  | Outer diameter of hollow fiber membrane | μm | 420 | 400 | 400 | 400 | 410 |
|  | Thickness of hollow fiber membrane | μm | 70 | 68 | 69 | 80 | 83 |
|  | Percentage of hollowness of hollow fiber membrane | % | 44 | 44 | 43 | 36 | 35 |
|  | Tortuosity | — | 3.1 | 3.8 | 4.4 | 4.1 | 3.6 |
|  | Membrane permeation flux | m³/m²/h | 1.35 | 1.40 | 1.70 | 1.60 | 1.90 |
|  | (a)/(b) (of hollow fiber membrane) | — | 0.97 | 1.11 | 1.24 | 1.30 | 1.32 |
|  | Opening ratio | % | 35 | 39 | 40 | 41 | 40 |

TABLE 2

|  |  |  | Example 11 | Example 12 | Example 13 | Example 14 | Comparative Example 1 | Comparative Example 2 | Comparative Example 3 |
|---|---|---|---|---|---|---|---|---|---|
| Raw material composition | Thermoplastic resin (A) | wt % | 22.9 | 52.3 | 52.3 | 52.3 | 81.9 | 71.0 | 29.9 |
|  | Plasticizer (B) | wt % | 17.0 | 7.2 | 7.2 | 7.2 | 13.0 | 20.0 | 5.0 |
|  | Structure-forming agent (C) | wt % | 60.0 | 40.0 | 40.0 | 40.0 | 5.0 | 8.9 | 65.0 |
|  | Antioxidant (D) | wt % | 0.1 | 0.5 | 0.5 | 0.5 | 0.1 | 0.1 | 0.1 |
| Production conditions | Spinning temperature | ° C. | 230 | 220 | 220 | 220 | 230 | 200 | 200 |
|  | Draft ratio | — | 200 | 400 | 400 | 400 | 60 | 100 | 200 |
|  | Chimney air speed | m/sec | 1.5 | 1.5 | 1.5 | 1.5 | 1.5 | 0.5 | 0.5 |
|  | Heat treatment temperature | ° C. | 180 | 180 | 180 | 180 | 180 | — | — |
|  | Heat treatment time | min | 20 | 10 | 15 | 10 | 10 | — | — |
| Physical properties of separation membrane | Width of voids | nm | 866 | 26 | 31 | 23 | — | 32 | 88 |
|  | Outer diameter of hollow fiber membrane | μm | 410 | 210 | 220 | 160 | 700 | 650 | 550 |
|  | Thickness of hollow fiber membrane | μm | 82 | 43 | 42 | 35 | 108 | 110 | 86 |
|  | Percentage of hollowness of hollow fiber membrane | % | 36 | 35 | 38 | 32 | 48 | 41 | 47 |
|  | Tortuosity | — | 3.8 | 2.7 | 3.2 | 3.8 | — | 9.4 | 11.4 |
|  | Membrane permeation flux | m³/m²/h | 2.10 | 0.74 | 0.83 | 0.81 | 0.00 | 0.21 | 0.36 |
|  | (a)/(b) (of hollow fiber membrane) | — | 1.37 | 0.98 | 1.05 | 0.93 | — | 1.43 | 1.38 |
|  | Opening ratio | % | 42 | 27 | 30 | 28 | — | 8 | 31 |

The membranes of Examples 1 to 14 each had a co-continuous structure. Further, the results given in Tables 1 and 2 show that the separation membranes of Examples 1 to 14 each had a tortuosity in the range of 1.0-6.0 and had a value of (a)/(b) (hollow fiber membrane) of 1.50 or less, showing that the voids were uniform in width.

The separation membrane of Comparative Example 1, although porous, was unable to be ascertained to have a co-continuous structure and had a membrane permeation flux of 0, rendering the calculation of tortuosity impossible. The separation membrane of Comparative Example 2 had a void width in the range of 1 nm to 80 nm and had a co-continuous structure, but had a tortuosity exceeding 6 and a membrane permeation flux less than 0.7. The separation membrane of Comparative Example 3 had a void width in the range of 80 nm to 100 nm and had a co-continuous structure, but had a tortuosity exceeding 6 and a membrane permeation flux less than 1.0. The results showed that membranes having a low tortuosity have higher water permeation performance than membranes having a similar void width and a similar membrane thickness.

The present invention provides a separation membrane having excellent separation performance and permeation performance and mainly including a thermoplastic resin. The separation membrane of the present invention can be used for water treatment membranes for producing industrial water, drinking water or the like from seawater, brackish water, sewage water, waste water or the like, medical membranes for artificial kidneys, plasma separation or the like, membranes for food-beverage industry such as fruit juice concentration, gas separation membranes for separating exhaust gas, carbonic acid gas, or the like, membranes for electronic industry such as fuel cell separators, or the like. The above-mentioned water treatment membrane can be preferably used for microfiltration membranes, ultrafiltration membranes, or the like.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 30, 2017 (Application No. 2017-67096), the contents thereof being incorporated herein by reference.

The invention claimed is:

1. A separation membrane having a shape of a hollow fiber and comprising polyamides as a main component, wherein
the separation membrane has voids therein which have a width of 1 nm-31 nm, wherein the voids have a tortuosity of 1.0-6.0, and
which has a membrane permeation flux at 50 kPa and 25° C. of 0.81 $m^3/m^2/h$-15 $m^3/m^2/h$,
which comprises a co-continuous structure that comprises a phase comprising the polyamides and the voids, and
which has a thickness of 1 μm to 43 μm and an outer diameter of 50 μm to 220 μm.

2. The separation membrane according to claim 1, wherein the polyamides are nylon-6 and/or nylon-66.

* * * * *